Nov. 29, 1966  N. A. ZELLMER ET AL  3,289,107
COMPANDOR SYSTEM EMPLOYING SYMMETRICAL VARISTORS
Filed Aug. 6, 1963  10 Sheets-Sheet 1
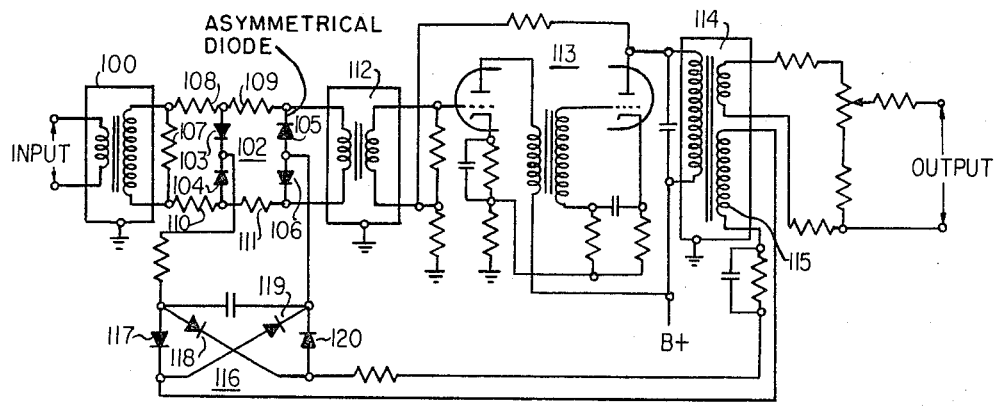
FIG.1 "PRIOR ART"
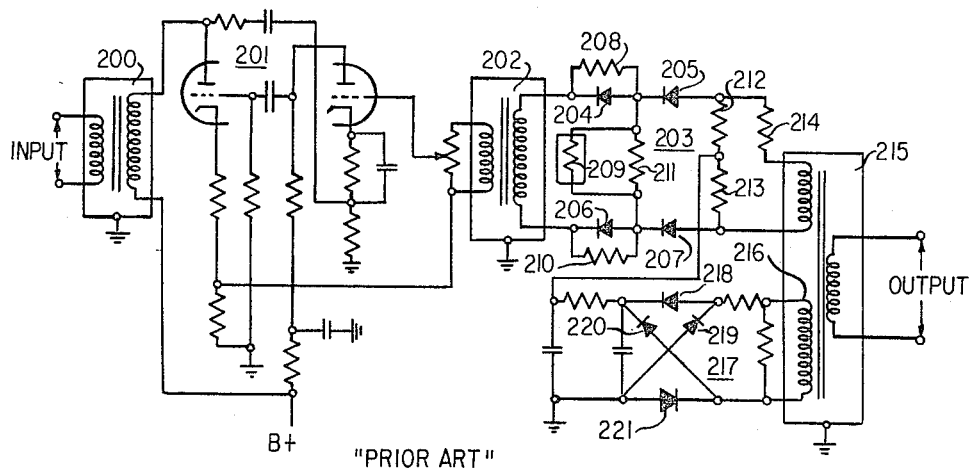
FIG.2 "PRIOR ART"
INVENTORS
George S. Wu
Neale A. Zellmer
BY
ATTY.

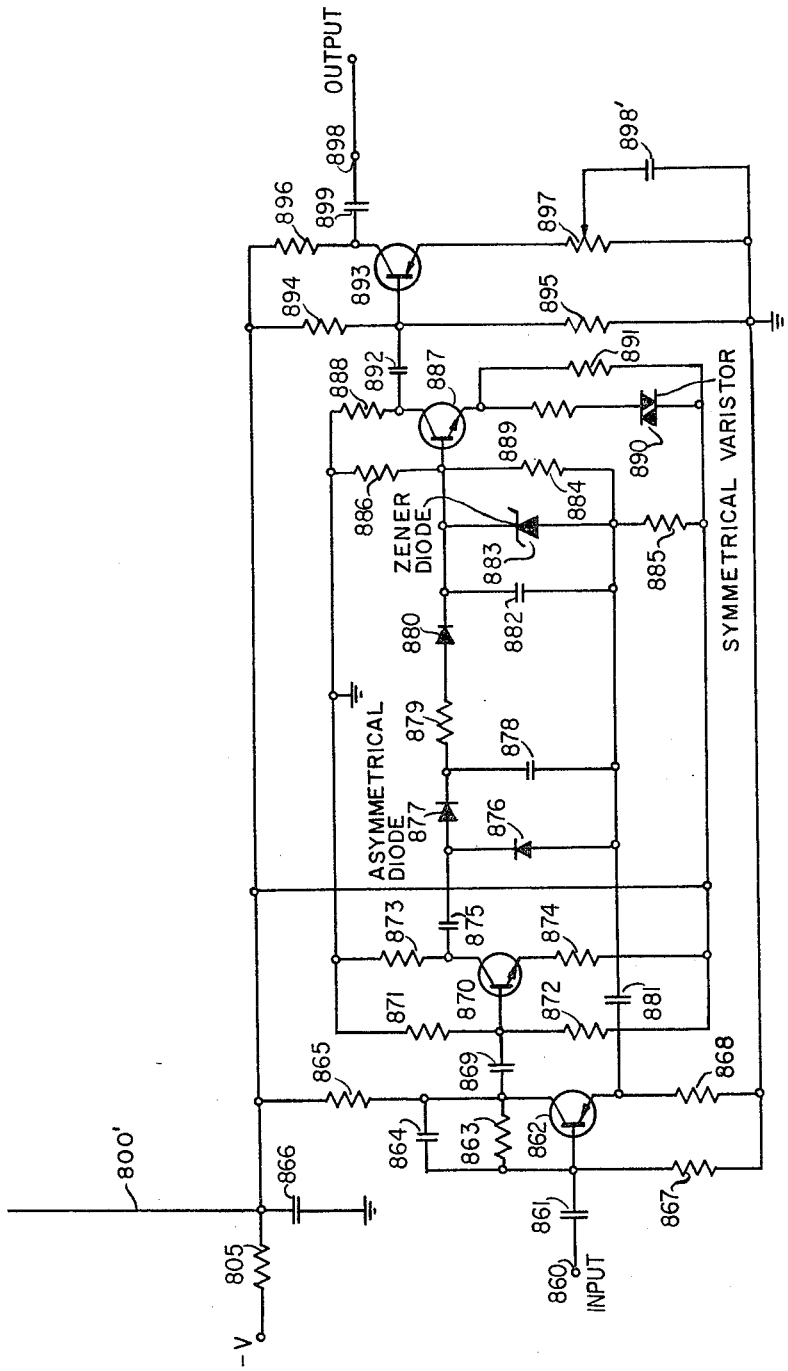

United States Patent Office 3,289,107
Patented Nov. 29, 1966

3,289,107
COMPANDOR SYSTEM EMPLOYING
SYMMETRICAL VARISTORS
Neale A. Zellmer, Belmont, and George S. Wu, Santa Clara, Calif., assignors, by mesne assignments, to Automatic Electric Laboratories, Inc., Northlake, Ill., a corporation of Delaware
Filed Aug. 6, 1963, Ser. No. 300,217
7 Claims. (Cl. 333—14)

This invention relates to compandors and in particular to compressor and expandor arrangements which employ symmetrical voltage sensitive resistances or symmetrical varistors as dynamic gain adjusting devices.

Communications systems can satisfactorily accommodate only a limited range of signal amplitudes. During transmission, the quietest parts of the signal must be well above the noise level of the system, while the loudest parts of the signal must have amplitudes that are below a level which would overload the system, for example, to prevent overload of system repeaters. Techniques have been employed to compress the amplitude range of input signals on the transmitting end of a system and to expand the amplitude range of the signal at the receiving end of the system when the dynamic range of the signal exceeds the dynamic range of the transmission system. The compressor-expandor system, hereinafter referred to as a compandor system, effectively improves the signal to noise ratio of the system, and in telephone system applications, enables toll quality transmission over circuits which would otherwise be unsuitable because of excessive noise or crosstalk.

Heretofore, most compandors have employed lattice configurations of critically matched diodes. These diodes are sometimes matched in pairs and sometimes in quads. Therefore, even close tolerance diodes must be manually selected in pairs, or in quads, according to the specific requirements of the particular system. "A Speech Compandor Using Junction Transistors," an article by D. Thomson, and published in the April 1962 issue of the Post Office Electrical Engineers Journal, describes a compandor system that was developed by the British Post Office which exploits the variable impedance of a forward biased base-to-emitter transistor junction. In either the matched diode case or the junction transistor case, a control current is generated to control the variable impedance of semiconducting devices, which are in turn incorporated into a resistive network. The control current is generated to produce the required compression or expansion by varying the insertion loss of the network. A major disadvantage of these techniques is that they require carefully selected or matched components in the variolosser portions of the circuits. The present invention, however, employs symmetrical varistors in active ladder networks in such a manner that standard production components may be used throughout the system with only a minimum of factory adjustment to allow for slight unit-to-unit differences in operating levels.

In conventional compandors the diodes are cascaded A.C.-wise and driven in parallel D.C.-wise extracting the $n/2n-1$ root resulting in a good compromise 2:1 compression ratio only for $n$'s that are greater than 5, where $n$ is an exponent by which current varies with voltage at a given point of the current-voltage characteristic (see section 1.2 below). By way of contrast, the invention when employing in one of its aspects, wherein two symmetrical varistors are driven in cascade both A.C.-wise and D.C.-wise, extracts the $n^2/2n^2-1$ root which results in a very good compromise 2:1 compression ratio for all "$n$'s" greater than 2.5.

The object of the invention is to provide a new and improved compandor system.

Another object of the invention is to provide new and improved compressor means for reducing the dynamic amplitude range of transmitted signals.

Still another object of the invention is to provide new and improved expandor means for restoring compressed signals to their original dynamic range.

A further object of the invention is to provide new and improved compressor means employing symmetrical varistors as dynamic elements.

A still further object of the invention is to provide new and improved expandor means employing symmetrical varistors as dynamic elements.

A feature of the present invention resides in the use of symmetrical voltage sensitive resistances to effect a variolosser action which adjusts the gain of the respective compressor or expandor rather than adjusting the attenuation as is conventionally practiced.

The invention, as to its operation, and the objects and features not specifically set forth, will best be understood by referring to the following description and the accompanying drawings.

In the drawings:

FIG. 1 is a circuit diagram of a prior art compressor circuit.

FIG. 2 is a circuit diagram of a prior art expandor circuit.

FIGS. 8A and 8B are together a circuit diagram of a preferred embodiment of the invention in which feedforward control loops are employed in the compressor and expandor sections of compandor for two way transmission at a system terminal station.

1.0 SYMMETRICAL VARISTORS 1.1 *General.*—Before describing the operation of the present invention, a brief discussion of symmetrical varistors, hereinafter referred to as varistors, will be offered in order to present a more clear understanding of the operation of the invention.

Varistors are manufactured from a granular semiconductor material, say silicon carbide (SiC), which is ceramically bonded, along with another material such as graphite, into a disc or rod-shaped resistor by a firing process. The electrical characteristics of the varistors are governed by the physical size, the geometric configuration, the relative amounts of the materials and the sintering process. The effects of varying these and other various governing particulars of varistors is explained in great detail in the article "Nonlinear Semiconductor Resistors," by F. A. Schwertz and J. J. Mazenko, in the August 1953 issue of the Journal of Applied Physics, vol. 24, No. 8. In general, the non-linearity of varistors is thought to be due to rectification occurring at the points of grain-to-grain contact. Therefore, varistors can be considered as an array of randomly connected series and parallel configurations.

1.2 *Varistor characteristics.*—The current-voltage characteristics of both varistors and asymmetrical varistors, hereinafter called semiconductor diodes or diodes, can be seen by referring to FIG. 9. The current-voltage relation of the varistor of FIG. 9 can be approximated by the equation $$I = KV^n \quad (1)$$

where V is the voltage across the varistor, I is the current through the varistor and K and n are physical constants of the device.

Figure 10:
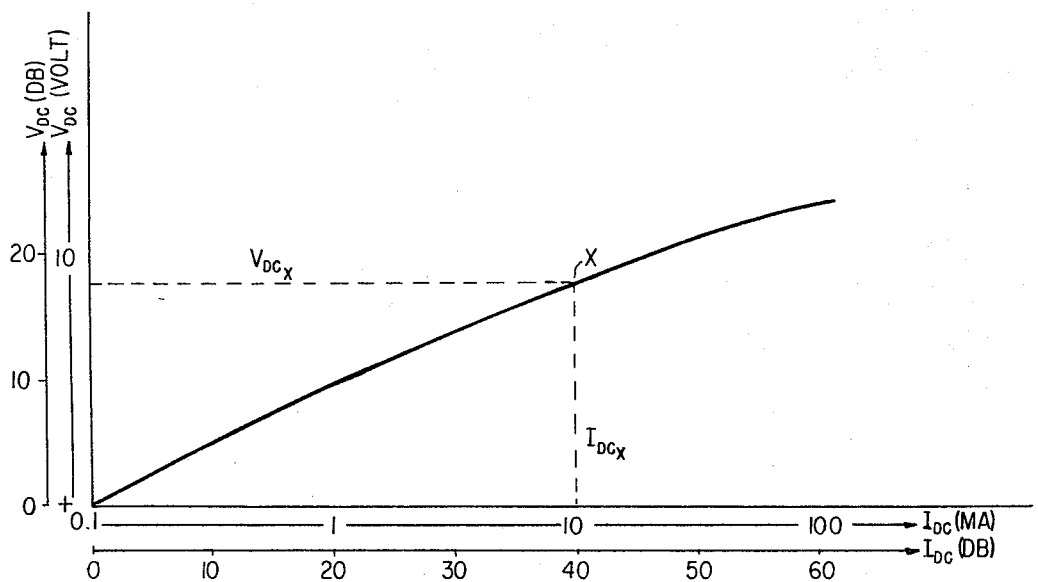
FIG. 10 is a graphical representation of a varistor characteristic curve on a log-log scale.
Figure 11:
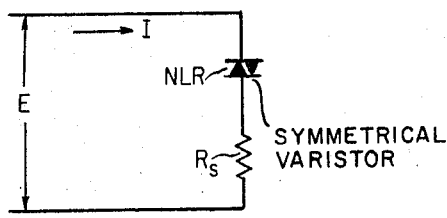
FIG. 11 is a circuit diagram of means employed in shaping the characteristics of symmetrical varistors.
Figure 12:
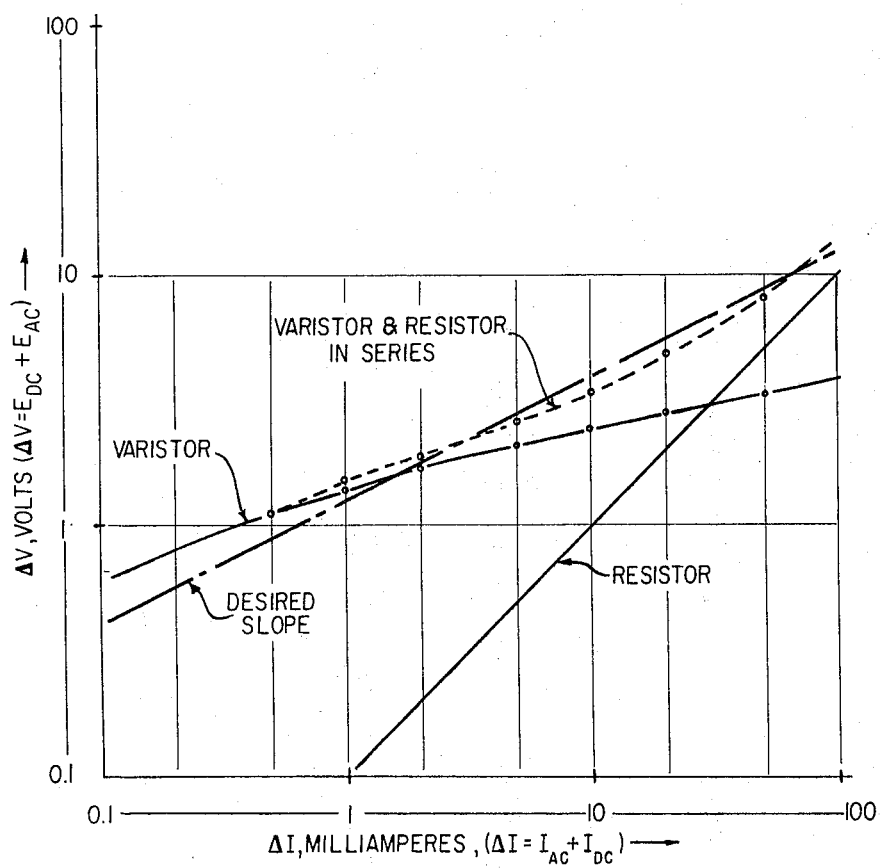
FIG. 12 is a graphical explanation of the effect of the technique of FIG. 11.
Figure 13:
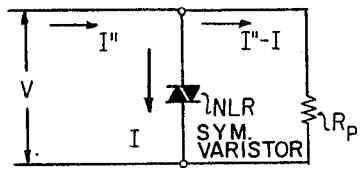
FIG. 13 is a circuit diagram of other means employed in shaping the characteristics of symmetrical varistors.
Figure 14:
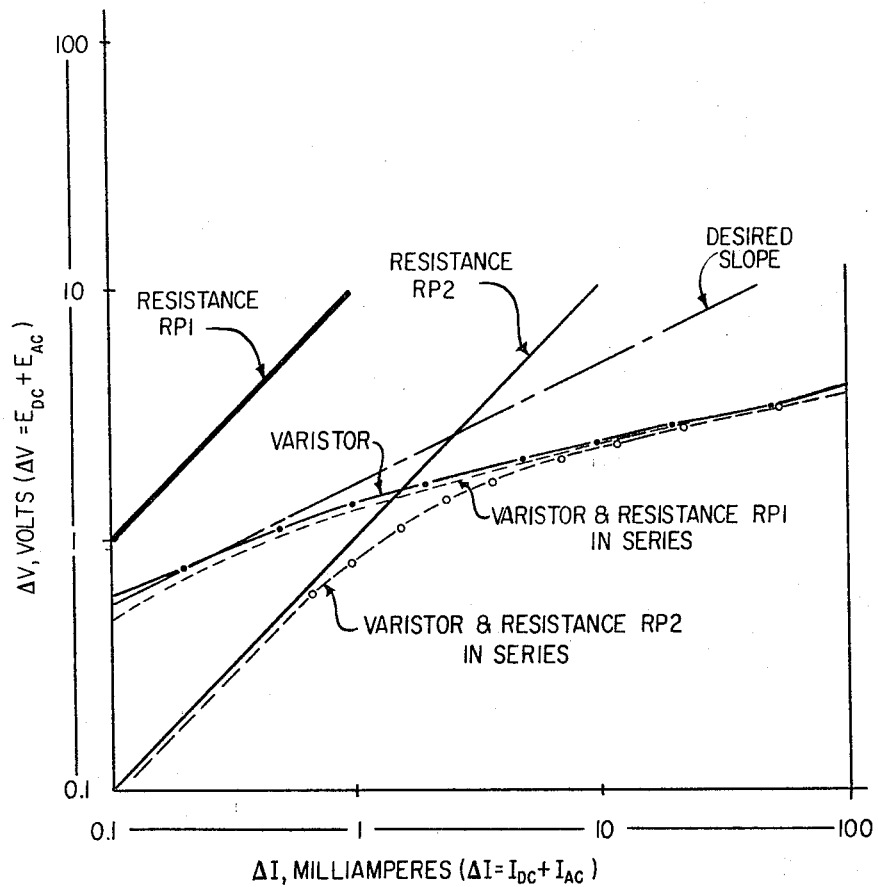
FIG. 14 is a graphical explanation of the effect of the technique of FIG. 13.

1.2.1 *Varistor log-log characteristics.*—As the operating range extends over several decades of both current and voltage, it is necessary to illustrate the characteristic on log-log scales in order to present the overall picture of operation. FIG. 10 is a log-log presentation of a characteristic curve of a varistor. It should be noted that the characteristic approaches a straight line, which tends to verify expression (1). Taking the logarithm of expression (1) gives $$\log I = \log K + n \log V \quad (2)$$

and differentiating expression (2)

$$\frac{d(\log V)}{d(\log I)} = \frac{1}{n} \quad (3)$$

Where the term $1/n$ is of course the log-log slope of the characteristic curve. In practice $n$ is not constant over a wide dynamic range; it varies approximately as the logarithm of the applied voltage.

An equivalent circuit for a varistor can be thought of as two series connected ressitances, one fixed in value and one variable. The variable ressitance is also shunted by a variable capacitance. At low bias voltages the variable resistance is much higher than the fixed resistance, and as shown in FIG. 10, dominates the lower portion of the characteristic curve in an ohmic manner showing about a 45° slope. At higher applied voltages, the variable resistance becomes small with respect to the fixed resistance to a limit where no appreciable change can be seen in the resistance of the combination since the fixed resistance is purely ohmic.

1.2.2 *Static and dynamic resistance.*—When an A.C. signal is superimposed on a D.C. bias which is supplied to a varistor, the A.C. signal will see an effective A.C. resistance that is equal ot the slope of the characteristic at that operating point. For example, the dynamic resistance, by definition $dV_x/dI_x$, of the varistor of FIG. 10 at point $x$ can be determined to be, by the slope of its characteristic curve at point $x$, $$R_{AC_x} = (R_{DC_x})(1/n_x) \quad (4)$$

and can be shown mathematically by altering expression (1) to account for the dynamic characteristic as shown by $$I_{DC} + dI = K(V_{DC} + dV)n \quad (5)$$

to be $$R_{AC} = dV/dI = 1/nKV_{DC}^{(n-1)} \quad (6)$$

in terms of voltage, and $$R_{AC} = 1/nK^{\frac{1}{n}}I_{DC}^{\left(\frac{n-1}{n}\right)} \quad (7)$$

in terms of current.

1.2.3 *Shaping the characteristic curve.*—Referring to FIGS. 11, 12, 13 and 14, it can be shown that a series resistance (FIGS. 11 and 12) effectively lowers the $n$ of the varistor-resistor combination and a parallel resistance (FIGS. 13 and 14) effectively makes the $n$ for the parallel combination slightly higher than the normal value for the varistor alone.

2.0 GENERAL DESCRIPTION 2.1 *Prior art type circuitry.*—FIG. 1 is a circuit diagram of a conventional compressor arrangement showing an input transformer 100, a variable attenuation network 102 including matched diodes 103–106 and resistances 107–111, interstage coupling transformer 112, a vacuum tube stage 113, an output transformer 114 including a winding 115 by which a portion of the output is fed back to the attenuation network 102 by way of the rectifier arrangement 116 including diodes 117–120.

FIG. 2 illustrates a conventional expandor arrangement. In general, the arrangement comprises an input transformer 200, a vacuum tube stage 201, an interstage transformer 202, a variable attenuation network 203 including matched diodes 204–207 and resistances 208–214, and an output transformer 215 having a winding 216 by which a portion of the output is fed back to the attenuation network 203 by way of the rectifier arrangement 217 including diodes 218–221.

Figure 3:
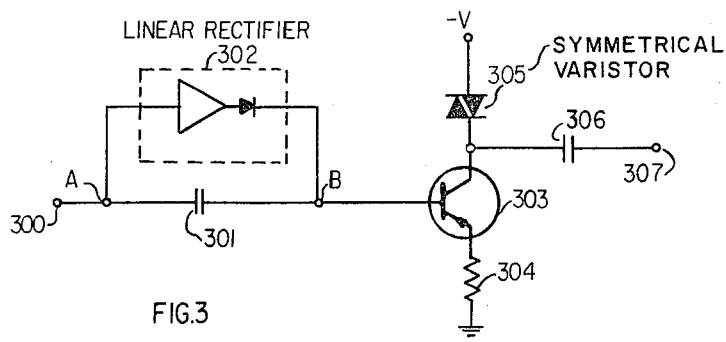
FIG. 3 is a circuit diagram of an embodiment of a compressor arrangement employing a feedforward control loop.

2.2 *Varistor compandor arrangements.*—FIG. 3 shows a compressor arrangement including an input terminal 300, a coupling capacitance 301, a transistor 303 connected in a common emitter configuration having a resistance 304 connected between its emitter and ground potential and a varistor 305 connected between its collector and the potential —V. A feedforward loop including the linear rectifier 302 derives a D.C. potential from point A and places said D.C. potential at point B as will be explained in the operational description. The compressed output is taken from the collector of transistor 303 and coupled to the output terminal 307 by way of capacitance 306.

Figure 4:
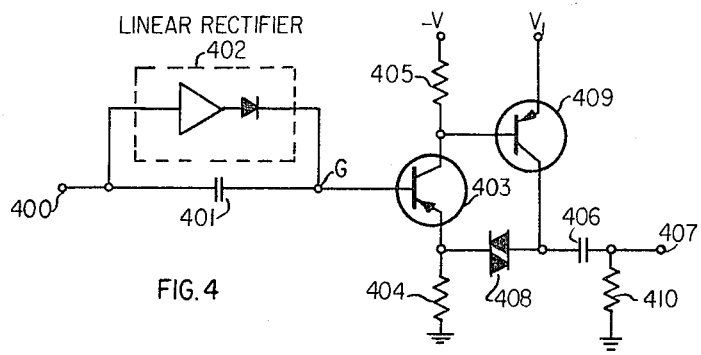
FIG. 4 is another embodiment of a compressor arrangement wherein a varistor is employed in a feedback configuration.
Figure 4A:
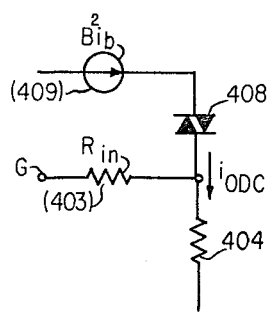
FIGS. 4A and 4B showing equivalent D.C. and A.C. circuits thereof.
Figure 4B:
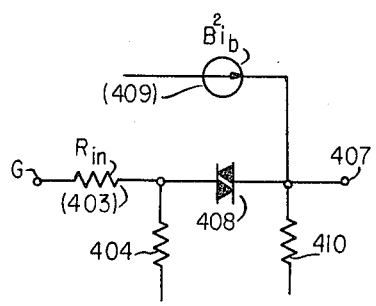

FIGS. 4, 4A and 4B show a compressor arrangement having the same compression ratio as that of FIG. 3. However, FIG. 4 employs two transistors 403, 409 and a varistor 408 for compression. Varistor 408 is connected in a feedback loop between the collector of transistor 409 and the emitter of transistor 403. FIGS. 4A and 4B describe the D.C. and A.C. equivalent circuits of FIG. 4, respectively, and show the instantaneous currents therein. FIG. 4 also has a linear rectifier 402 for deriving a D.C. bias in a feedforward manner.

Figure 5:
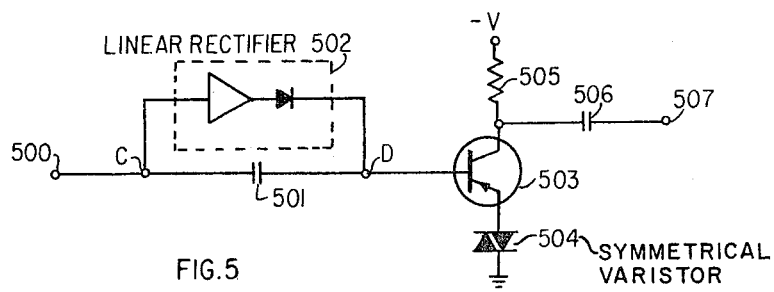
FIG. 5 is a circuit diagram of an embodiment of an expandor arrangement employing a feedforward control loop.

FIG. 5 shows an expandor arrangement that is similar to the compressor of FIG. 3 comprising an input terminal 500, a coupling capacitance 501, a common emitter transistor 503 having a varistor 504 connected between its emitter and ground and a resistance 505 connected between its collector and the potential —V. The linear rectifier senses the A.C. signal at point C and places a corresponding D.C. potential at point D. The output is coupled from the collector to the terminal 507 by the capacitance 506.

Figure 6:
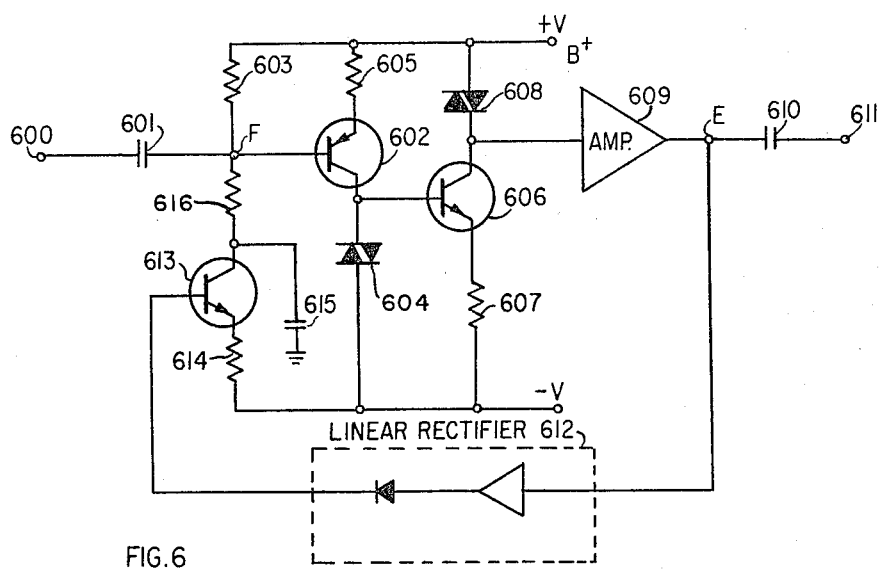
FIG. 6 is a circuit diagram of an embodiment of a two varistor compressor arrangement having a D.C. feedback control loop and employing the principles of the invention.
Figure 6A:
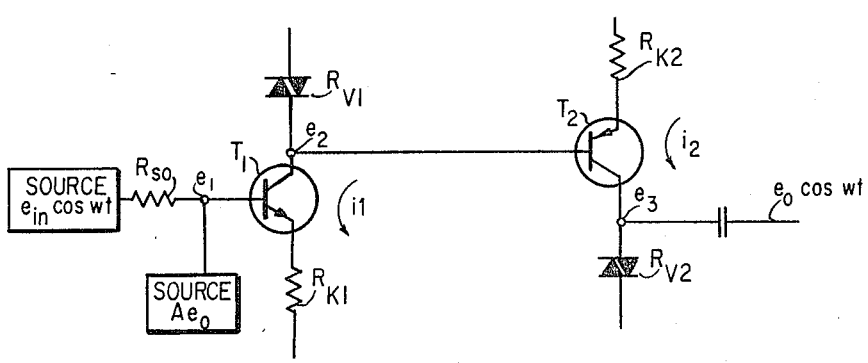
FIG. 6A is a circuit diagram showing the operation of a two varistor compressor arrangement.

FIG. 6 and its opposite polarity counterpart, FIG. 6A show another type of compressor arrangement, the two varistor arrangement. This general description is for FIG. 6; FIG. 6A will be explained in great detail in the operational description below. FIG. 6 comprises input terminals 600, an input coupling capacitor 601, transistor 602 having its base and emitter connected to the potential +V by way of resistances 603 and 605, respectively, and its collector connected to potential −V via varistor 604. The collector of transistor 602 is also directly connected to the base of transistor 606 which has its collector connected to potential +V by way of varistor 608 and has its emitter connected via resistance 607 to potential −V. Transistor 606 also has its collector coupled to the output terminals 611 via amplifier 609 and capacitance 610. A feedback control loop is connected between the junction points E and F and includes linear rectifier 612 and a D.C. amplifier having a transistor 613 which has its collector connected to point F via resistance 616 and to ground via the bypass capacitor 615. Its emitter is connected to potential −V by resistance 614 and its base is connected to the output of the rectifier 612.

Figure 7:
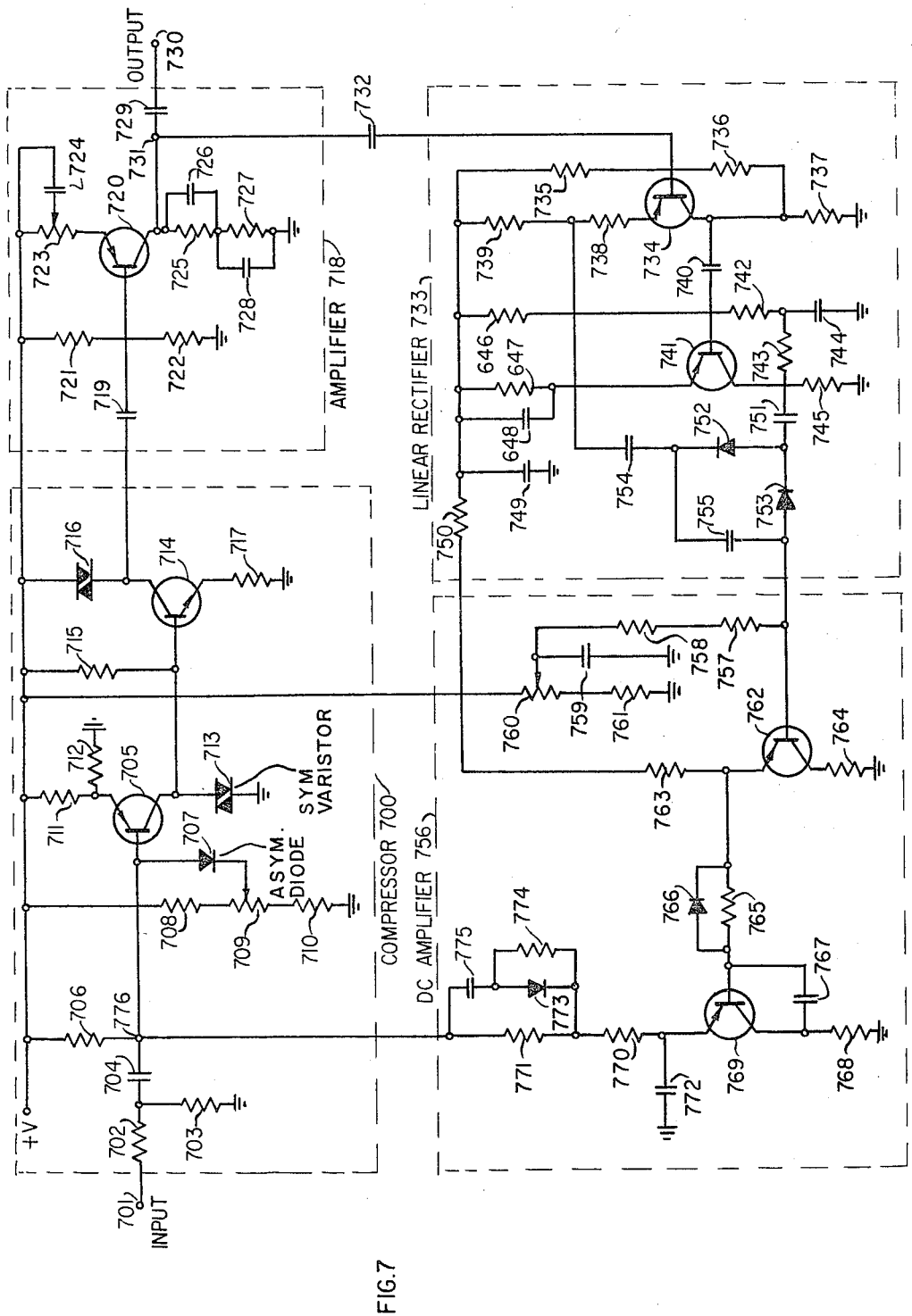
FIG. 7 is a circuit diagram of another embodiment of a compressor arrangement employing a D.C. feedback control loop.
Figure 8A:
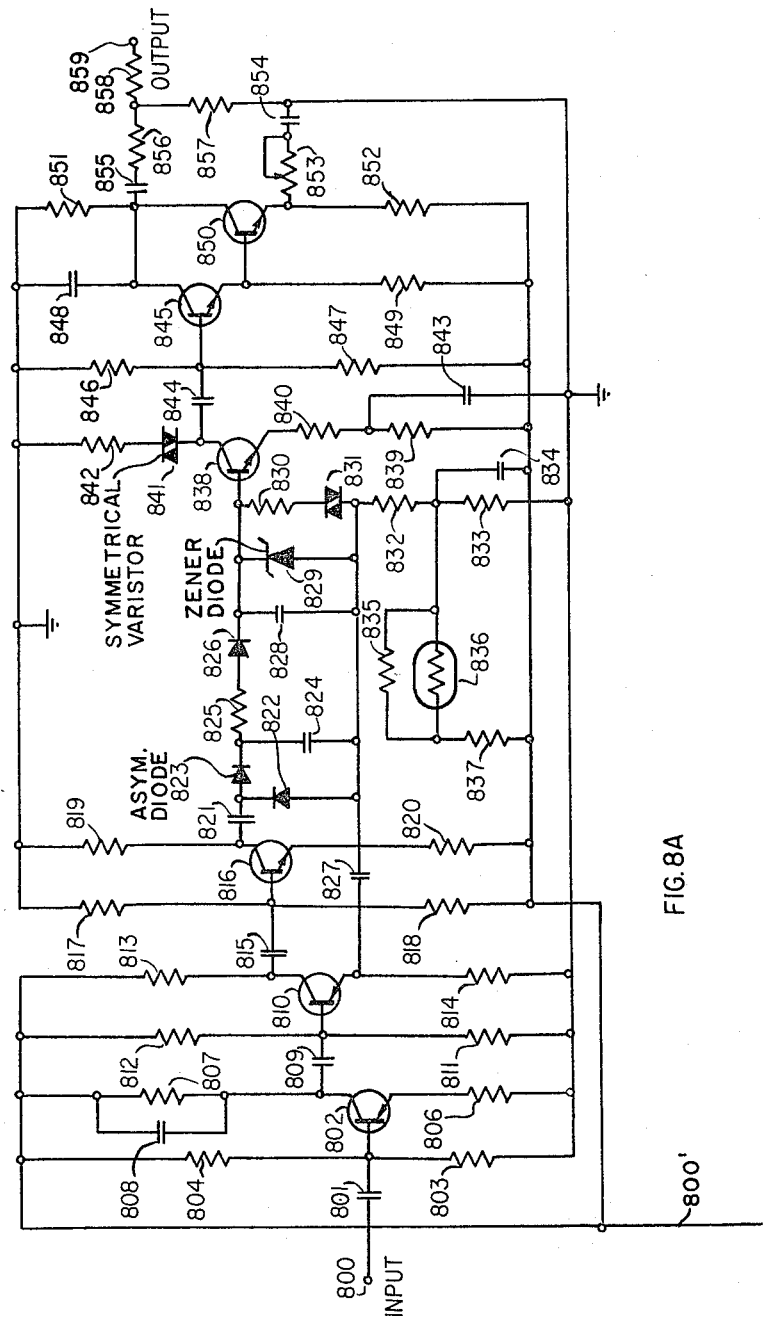

The linear rectifiers of FIGS. 3, 4, 5 and 6 may be realized by circuitry such as in FIGS. 7, 8A and 8B. Linear rectifiers, however, are not limited to those illustrated and may comprise any workable configuration as design permits.

FIG. 7 is another embodiment of a compressor arrangement showing circuitry of the linear rectifier and D.C. amplifier. The compressor arrangement consists of essentially four major components the first of which is the compression circuit 700.

Major component 700 includes an input terminal 701, an impedance pad having elements 702, 703, and 704, transistor 705 having its base connected to the potential +V via a resistance 706 and also by diode 707 and the voltage divider network elements 708 and 709. The base of transistor 705 is also connected to ground potential via the voltage divider elements 709, 710. The collector of transistor 705 is connected between +V and ground potentials by way of resistances 711 and 712, respectively, while the emitter is connected to ground via varistor 713. The second transistor, 714, of the compression circuit has its base connected to potential +V by way of resistance 715 and also to the collector of transistor 705. Transistor 714 has its collector connected to +V by varistor 716 and its emitter connected to ground via resistance 717.

The second major component is the output amplifier stage 718 including transistor 720 which has its input at its base electrode by way of capacitance 719 from the collector of transistor 714. This base is also at some D.C. potential between +V and ground by virtue of resistances 721 and 722. Connecting the emitter of transistor 720 to potential +V is resistance 723 a portion of which is shunted by capacitance 724. Connecting the corresponding collector to ground are resistances 725 and 727, each respectively shunted by capacitances 726 and 728. Capacitances 729 couples the output of transistor 720 from its collector to output terminal 730.

Linear rectifier 733 is coupled from point 731 of the amplifier 718 via capacitance 732 and the base of transistor 734. Transistor 734 has its base connected on one hand to potential +V via resistances 735 and 750, and to the collector and on to ground on the other hand by way of resistances 736 and 737. The emitter of 734 is connected to the +V potential via elements 738, 739, and 750. The output of transistor 734 is coupled to the base of transistor 741 via capacitance 740. The base of 741 is connected to the +V potential on the one hand via resistances 746, 750 and to its corresponding collector and on to ground via resistances 742, 743, and 745. An A.C. ground connection also exists between the junction of elements 742 and 743 via capacitance 744. The emitter electrode of transistor 741 is connected via resistances 747 and 750 to potential +V, resistance 747 being shunted by capacitance 748. Diodes 752 and 753 are coupled to the output of transistor 741 (collector electrode) and serve to rectify the output. Capacitance 754 couples diode 752 and capacitance 755 back to the emitter circuit of transistor 734.

The fourth major component, the D.C. amplifier 756, has its input from the linear rectifier 733 at the base of transistor 762 which has its collector connected via resistance 764 to ground potential and its emitter connected via resistance 763 to the potential +V. Elements 757–761 and 765–768 are for time constant purposes and will be discussed below. The collector of transistor 762 is connected to the base of transistor 769 by way of resistance 765. The base of transistor 769 is coupled via elements 767 and 768 to the collector and to ground. The emitter is connected to point 776 of the compressor 700 (at the base electrode of transistor 705) via resistances 770 and 771.

FIGS. 8A and 8B are together a circuit diagram of a compandor at one end of a transmission network having the facility to compress signals for transmission and to expand received compressed signals, FIG. 8A portion of the figure being the compressor unit and FIG. 8B being the expandor unit.

The compressor portion of the compandor (FIG. 8A) comprises an input stage including input terminal 800 coupled to the base of transistor 802, said base being placed between the potentials of ground and −V via resistances 803 and 804–805 respectively. The emitter of transistor 802 is connected to ground via resistance 806 and the collector is connected on the one hand to −V via elements 807, 808, and 805, and is coupled to the base of transistor 810 via capacitance 809 on the other hand. The base of transistor 810 is connected between ground and −V by resistances 811 and 812, 805 respectively. The collector of transistor 810 is connected to −V via resistances 813 and 805, while resistance 814 connects the emitter to ground potential. Transistor 810 has two outputs, one to a feedforward loop including a linear rectifier and on to the compression circuit and another directly coupled to the compression circuit.

The first of these outputs is taken from the collector of transistor 810 and coupled via capacitance 815 to the base of transistor 816. The base of transistor 816 is connected to ground via resistance 817 and to −V via resistance 818 and 805. Resistance 819 connects the collector to ground and resistances 820 and 805 connect the emitter to the −V potential. The output of transistor 816 is coupled to the base of the compression circuit (transistor 838) via elements 821–826, a doubler and filter arrangement.

The second output of transistor 810 is taken off its emitter and coupled to the base electrode of transistor 838 via capacitances 827 and 828. Also, connected in parallel with element 828 are elements 829 and 730–731, which will be explained below. Now, provision has been made for both A.C. and D.C. signals to be at the base of transistor 838, the base further being connected to ground via elements 830–833 and to −V A.C.-wise via elements 830–832 and 834. Varistor 841 and resistance 842 connect the collector to ground and its emitter is connected to −V via resistances 840 and 839, element 843 also coupling the emitter to ground potential. The output of the compression circuit is coupled via capacitance 844 to the output amplifier stage including two transistors, 845 and 850, in a Darlington type composite having their collectors connected to ground by way of elements 848 and 851, respectively, and having their emitters connected to resistance 805 and potential −V by way of resistances 849 and 852, respectively. Elements 853 and 854 also connect the emitter of transistor 850 to ground. The output of the compressor is coupled to the output terminal 859 via capacitor 855 and the resistance pad 856–858.

The expandor arrangement of the compandor (FIG. 8B) is somewhat similar to the compressor arrangement just described. The expandor includes an input transistor 862 having its base input coupled to the input terminal 860 by capacitance 861. Shunting between the collector and base is an R-C arrangement including capacitance 864 and resistance 863. Connecting the collector to $-V$ is resistances 865 and 805. Connecting the base to ground is resistance 867 and the emitter to ground is resistance 868. Like transistor 810 of the compressor, transistor 862 has two outputs, one to the expansion circuit (transistor 887) by way of a feedforward linear rectifier loop, and another capacitively coupled to the expansion circuit. The feedforward loop comprises the transistor 870, capacitively coupled (869) from the collector of transistor 862, having its base and collector connected to ground via resistances 871 and 873 respectively. Transistor 870 also has its emitter and base connected to $-V$ potential by way of resistances 874, 805 and 872 respectively. The output is coupled by way of elements 875–880 to the base of transistor 887. Another output from transistor 862 is coupled from its emitter via elements 881 and 882 to the base of transistor 887.

The base of the compression transistor is connected to ground via resistance 886 and to $-V$ via the combination of elements 883–885. Its collector is connected to ground via resistance 888 and its emitter to $-V$ via the combination of elements 889–891, 805.

The following stage, transistor 893, is capacitively coupled from the collector of transistor 887 via element 892, its base being connected between $-V$ and ground by virtue of elements 894, 805 and 895. The emitter is connected to ground by way of resistance 897 (and capacitance 898) while its collector is connected via elements 896, 805 to $-V$. The output of the expandor is coupled from the collector of transistor 893 to the output terminal 0899 via capacitance 899.

3.0 DESCRIPTION OF OPERATION 3.1 *General.*—FIG. 6A has been referenced in a manner that is different from the other drawings to better illustrate compandoring by employing the dynamic characteristics of varistors.

Referring to FIG. 6A, let $R_{v1}$ and $R_{v2}$ be the effective resistances of the two varistors and $\beta_1$, $\beta_2$ are the respective current gains of transistors $T_1$ and $T_2$. Also assume that the circuit is properly biased for operation and $\beta_1 R_{k1} >> R_{so}$ and $\beta_2 R_{k2} >>$ than $R_{v1}$.
Then we may assume $$i_1 = e_1/R_{k1} \quad (8)$$

and $$i_2 = e_2/R_{k2} \quad (9)$$

and by definition from expression (1)

$$e_2 = (i_1/k_1)^{1/n_1} \quad (10)$$

and $$e_3 = (i_2 k_2)^{1/n_2} \quad (11)$$

where $k_1$, $n_1$ and $k_2$, $n_2$ are the arbitrary parameters of the varistors $R_{v1}$ and $R_{v2}$, respectively. Therefore, from expressions (8), (9), (10) and (11), $$e_3 = [(1/k_2 R_{k2})(e_1/k_1 R_{k1})^{1/n_1}]^{1/n_2} \quad (12)$$

Now, if the signal at the base of transistor $T_1$ is of the form $$e_1 = Ae_0 + e_{in} \cos wt \quad (13)$$

Where A is the D.C. conversion gain, then $$e_3 = \left[ \frac{(Ae_0)^{1/n_1 n_2}}{(K_2 R_{k2})^{1/n_2}(K_1 R_{k1})^{1/n_1 n_2}} \right] \quad (14)$$

$$[1 + (e_{in}/Ae_o) \cos wt]^{1/n_1 n_2}$$

Letting M equal the first quantity and making a Taylor expansion $$e_3 = M[1 + (e_{in}/n_1 n_2 Ae_o) \cos wt + (1/n_1 n_2)(1/n_2 n_2 - 1)(e_{in}/Ae_o)^2 \cos^2 wt + \ldots] \quad (15)$$

If $(e_{in}/Ae_o) < 1$, then it can be shown that the compression ratio C.R. in db can be expressed $$C.R. = \log e_o / \log e_{in} = n_1 n_2/(2n_1 n_2 - 1) \quad (16)$$

and if $2n_1 n_2 >> 1$ $$C.R. = \frac{1}{2} \quad (17)$$

Since the exponent $n$ of a varistor increases as the level of operation increases, the compression ratio comes nearer to equalling 1:2 at higher input voltages.

3.2 *Operation of varistor compandors.*—The foregoing explanations of varistor characteristics and techniques have been treated in detail so that one skilled in the art will be made aware of the various applications of varistors in compandoring. Therefore, the following explanations of operation will rely on the above principles in the various arrangements and will only be treated in such detail as is pertinent to the specific arrangement being described.

Referring to FIG. 3, the arrangement represented therein will provide dynamic range compression with a compression of ratio of $n$. It has been shown that instantaneous current through a varistor is related to the instantaneous voltage thereacross by expression (1). In FIG. 3 with the potential at points 300 and A being $E_{max} \cos wt$, the potentials at point B will be $E_{max} \cos wt + AE_{max}$ due to the input signal being superimposed upon the derived dc bias signal $AE_{max}$. A mathematical derivation according to a procedure similar to that followed with respect to FIG. 6A gives the expression for the output signal at terminal 307 as $$e_o = \frac{E_{max}^{1/n} \cos wt}{n[A^{(n-1)} K R_k]^{1/n}} \quad (18)$$

where $R_k$ is resistance 304 and $n$ and K are the constants of varistor 305. Expression (18) shows that for every $n$ db of amplitude range in the input signal, there is only 1db of amplitude range in the output signal.

Referring to FIGS. 4, 4A, and 4B, another embodiment of a compressor arrangement is shown which has a compression ratio of $n$. This arrangement, however, employs the varistor 408 in a feedback path between the collector of transistor 409 and the emitter of transistor 403. FIG. 4A illustrates the D.C. equivalent of FIG. 4 and FIG. 4B illllustrates the A.C. equivalent. In FIG. 4A the output current through the varistor 408 and the resistance is much less than the base current of transistor 409 which can be approximately as $$i_b = \frac{e_{in} - i_o R_k}{R_{in}} \quad (19)$$

where $R_k$ is the resistance 404 and $R_{in}$ is the sum of the base resistance, $r_b$, of transistor 403 and the equivalent emitter resistance $B_{re}$, of transistor 403. In the A.C. equivalent circuit, FIG. 4B, the sum of the effective resistance of varistor 408 and the resistance 404 is much greater than resistance 410 and the feedback current through varistor 408 is greater than the base current $i_b$. Employing a mathematical analysis to FIG. 4 similar to that used in the discussion of FIGS. 3 and 6A yields again expression (18). Therefore, the compressor arrangement in FIG. 4 has a compression ration of $n$.

Referring to FIG. 5, an expandor arrangement is represented wherein the direct current bias is derived from the A.C. input signal and placed on the base of transistor 403 in a feedforward manner. As was the case in FIG. 3, the A.C. input signal, $E_{max} \cos wt$, is superimposed upon the D.C. bias, $AE_{max}$, derived therefrom. Again, employing expression (1) and procedure similar to that employed in the discussion of FIG. 6A, another mathematical analysis gives the equation $$e_o = E_{max}^n \cos wt (nKA^{(n-1)} R_L) \quad (20)$$

where $R_L$ is the value of resistance 505 and $n$ and K are the constants of varistor 504. Expression (20) shows that for every db variation in amplitude of the incoming signal, there will be $n$ db variation in the output signal of the expandor. Therefore, FIGS. 3 and 4, or FIGS 3 and 5 make a compandor with a compression-expansion ratio of $n$.

Referring to FIG. 7, still another embodiment of a compressor arrangement is shown wherein a D.C. bias is derived from the compressor output stage and fed back rather than forward. A signal to be transmitted is put into the unit at terminal 701 which is connected to the input pad 702, 703 and coupled to the junction 776 which is the base of transistor 705. At junction 776 the A.C. signal is superimposed on a D.C. bias, the derivation of which will be discussed below. Compression of the dynamic amplitude range of the signal is accomplished in the stages including transistors 705, 714 and varistors 713, 716 in a manner similar to that discussed for FIG. 6A. The compressed signal undergoes a final amplification by the emitter-follower arrangement of transistor 720 before being coupled to the output terminal 730 via capacitance 729. At terminal 731 the output of the amplifier is coupled via capacitance 732 to the linear rectifier circuit 733 where transistors 734, 741 and diodes 752, 753 derive a D.C. to be applied to the compression circuit 700. The D.C. derived in the rectifier 733 is amplified by the D.C. amplifier 756 and injected into the compressor 700 at junction 776.

Referring to FIGS. 8A and 8B an end terminal compandor is shown for both compression of outgoing signals and expansion of incoming signals.

In the compressor portion (FIG. 8A) the signal to be transmitted is coupled from the input terminal 800 via capacitance 801 to the input amplifier stage including transistor 802. The amplified signal is coupled to an emitter-follower transistor 810, where at one of its outputs (emitter electrode), the signal is coupled to the compression transistor 838 via the series capacitances 827, 828. A second (collector electrode) output from transistor 810 is coupled via capacitance 815 to the linear rectifier arrangement including an amplifier (816) circuit and a voltage doubler rectification network, elements 821–826. At the base of transistor 838 there is now an A.C. signal superimposed upon a D.C. bias voltage. It should be noted at this point that the rectifier diodes 822, 823 have low impedance characteristics with low firing potentials so that the linear rectifier will respond to low amplitude signals and its D.C. output is linear in proportion to the input signal strength. Also, the resistance value of 832, 833 controls the amount of loop current feedback, and thus, the signal to D.C. conversion factor "A." The R-C network filters the output of the linear rectifier, and in addition, give the compandor a fast attack time and a slow decay time for a rapid response to the input signal level and a decay at the syllabic rate. In practice these times have been compromised to 2 or 3 milliseconds and 0.1 or 0.2 second, respectively, which is satisfactory. Elements 819, 821, 824, and 825 determine the attack time, while elements 828, 830 and 831 govern the decay time. Diode 826 insures that capacitance 828 discharges through resistance 830 and varistor 831. Varistor 831 is to compensate for an S shaped compressor response and to unload the rectifier at low levels. Zener diode 829 is used in one practical application where limitations of the system made it necessary to limit the dynamic range and provide a one-to-one slope for signals greater than −10 dbm. Elements 835–837 add a D.C. voltage in series with the output of the linear rectifier to help compensate nonlinearity at low levels, capacitance 834 shunting the elements to avoid altering the loop feedback current. The A.C. signal and the D.C. bias are applied to the transistor 838 having the elements 839–842 in its emitter-collector path where compression of the signal occurs, the active region equivalent generator of the transistor being a function of the base current. An output amplifier of a Darlington compound configuration (845, 850) is provided to couple the compressed output signal to the output terminal 859 due to the unloading of varistor 841 at low levels.

The expandor portion (FIG. 8B) of the compandor includes an almost identical circuit configuration and operates in much the same manner as the compressor portion. However, there are two main differences. First, for the function of expansion, the varistor 890 is in the emitter circuit of transistor 887, and second, the unloading problem of the previous paragraph is not present and only a simple emitter follower output amplifier (893) is needed.

Figure 9:
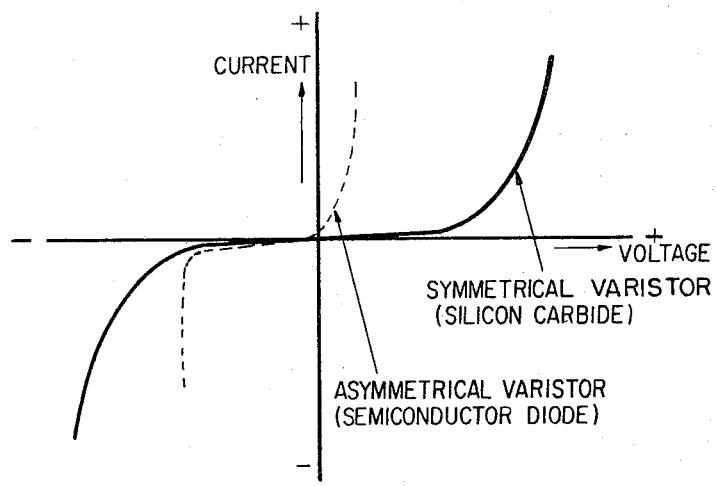
FIG. 9 is a representation of the current-voltage characteristics of symmetrical and asymmetrical varistors.

FIG. 9 has been explained in as much detail as is necessary to describe the invention in section 1.2, *Varistor characteristics*. The same is true for FIG. 10 which is described in section 1.2.1, *Varistor log-log characteristics*, and section 1.2.2, *Static and dynamic resistance*.

FIGS. 11, 12 13, and 14 have been discussed briefly in section 1.2.3, *Shaping the characteristic curve*, and no further explanation is needed.

Figure 15:
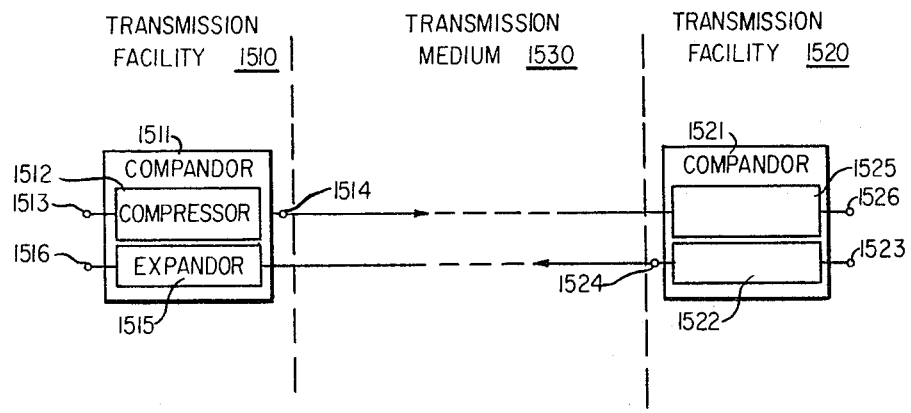
FIG. 15 is a block diagram representation of end-to-end operation of the present compandor in a transmission system.

FIG. 15 is a block diagram of a two way transmission system in which the compandors may be, for example, the arrangements shown in FIGS. 8A and 8B, or any other compatible varistor compressors and expandors. In FIG. 15 two transmission facilities 1510, 1520, which could very well be carrier terminals, are connected via a transmission medium 1530 for compandoring in each direction. Compandor 1511 includes a compressor 1512 having an input 1513, and an output 1514 which is connected to the receiving expandor 1525 of the compandor 1521. Compandor 1521 also includes a compressor 1522 having an input 1523, and an output 1524 which is connected to the expandor 1515 of compandor 1511. The expandors 1515 and 1525 have outputs 1516 and 1526, respectively.

Figure 16:
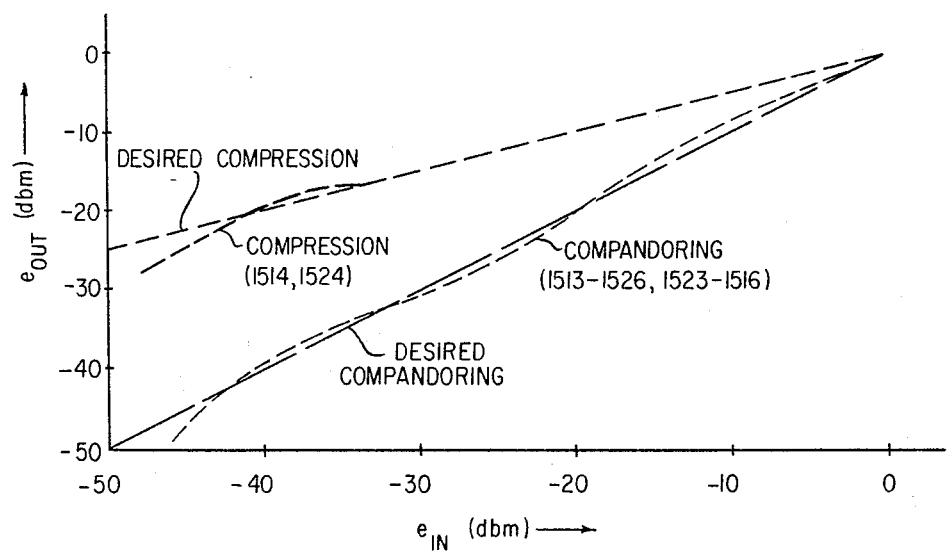
FIG. 16 is a graph showing the effect of the present compandor system represented in FIG. 13.

Referring to FIG. 15 and to the graph of FIG. 16, it can be seen that a 2:1 compression followed by a 1:2 expansion results in an overall compandoring system wherein an input signal dynamic range, at say input 1513, is reproduced at the corresponding expandor output, in this case output 1526, and the compandored signal ratio from one facility to another is 1:1.

Many changes and modifications may be made in the invention by one skilled in the art without departing from the spirit and scope of the invention and should be included in the appended claims.

What is claimed is:

1. An arrangement for altering the dynamic amplitude range of an alternating current input signal nonlinearly as a function of various levels of said signal, said arrangement comprising an alternating current signal path, linear rectifier means including an input and an output, said input connected to said signal path for deriving a direct current control signal of a level varying as a function of the levels of said input signal, and amplifier means interposed in said signal path and including transistor means having at least three electrodes, one of said electrodes receiving said input signal and coupled to said output of said rectifier means to receive said control signal superimposed upon said alternating input signal, and symmetrical nonlinear resistance means serially connected to another of said electrodes for automatically varying the gain of said amplifier means in accordance with the variations of said control signal and said input signal.

2. An arrangement for altering the dynamic amplitude range of a signal, as claimed in claim 1, wherein said another electrode is the collector electrode and said symmetrical nonlinear resistance means is connected in circuit therewith to provide greater gain at lower levels of said input signal.

3. An arrangement for altering the dynamic amplitude range of a signal, as claimed in claim 1, wherein said another electrode is the emitter electrode and said symmetrical nonlinear resistance means is connected in circuit therewith to provide greater gain at higher levels of said input signal.

4. An arrangement for altering the dynamic amplitude range of a signal, as claimed in claim 1, means, said second nonlinear resistance means comprising second symmetrical nonlinear resistance connected to said output of said rectifier means and to said one electrode for unloading said rectifier means at low signal levels.

5. An arrangement for altering the dynamic amplitude range of a signal, as claimed in claim 1, and further comprising direct current amplifier means interposed between and coupling said output of said rectifier means to said one electrode of said transistor means.

6. An arrangement for altering the dynamic amplitude range of a signal, as claimed in claim 1, wherein said amplifier means comprises second transistor means having one electrode and another electrode respectively corresponding to said one electrode and said another electrode of the first-mentioned transistor means, and other nonlinear resistance means serially connected to said another electrode of said second transistor means, and said one electrode of said second transistor means connected to said another electrode of the first-mentioned transistor means.

7. An arrangement for altering the dynamic amplitude range of a signal, as claimed in claim 1, wherein said amplifier means further includes another transistor means having first and second electrodes respectively corresponding to said one and said another electrodes of the first-mentioned transistor means and having a third electrode, and wherein said nonlinear resistance means is connected in a feedback path between said another electrode of the first-mentioned transistor means and said third electrode of the other said transistor means, said one electrode connected to said second electrode and said first adapted to receive said input and control signals so that said one electrode is coupled to receive said two signals via said another transistor means.

References Cited by the Examiner
UNITED STATES PATENTS

| | | | |
|---|---|---|---|
| 2,019,637 | 11/1935 | Shelleng | 333—14 |
| 2,833,869 | 5/1958 | Ward | 330—128 |
| 2,854,590 | 9/1958 | Wolfe | 307—88.5 |
| 2,870,271 | 1/1959 | Cronburg et al. | 330—14 X |
| 2,929,015 | 3/1960 | Fleming | 328—142 X |
| 3,086,179 | 4/1963 | Powers | 333—14 |
| 3,098,199 | 7/1963 | Carney et al. | 330—29 |
| 3,138,766 | 6/1964 | Daniel | 333—14 X |
| 3,188,575 | 6/1965 | Sheffet | 330—23 |
| 3,215,858 | 11/1965 | Harding et al. | 307—88.5 |

OTHER REFERENCES

Mathes et al.: The Compander—An Aid Against Radio Static, Electrical Engineering, June 1934, pages 860–866.

HERMAN KARL SAALBACH, *Primary Examiner.*

P. GENSLER, *Assistant Examiner.*